United States Patent
Koo et al.

(10) Patent No.: US 9,846,742 B2
(45) Date of Patent: Dec. 19, 2017

(54) APPARATUS AND METHOD FOR PROVIDING COMMUNITY SERVICE

(71) Applicant: Samsung SDS Co., Ltd., Seoul (KR)

(72) Inventors: Ja-Wook Koo, Seoul (KR); Young-Gun Shin, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 472 days.

(21) Appl. No.: 14/380,592

(22) PCT Filed: Feb. 19, 2013

(86) PCT No.: PCT/KR2013/001290
§ 371 (c)(1),
(2) Date: Aug. 22, 2014

(87) PCT Pub. No.: WO2013/125833
PCT Pub. Date: Aug. 29, 2013

(65) Prior Publication Data
US 2015/0046470 A1 Feb. 12, 2015

(30) Foreign Application Priority Data
Feb. 23, 2012 (KR) .................. 10-2012-0018584

(51) Int. Cl.
*G06F 17/30* (2006.01)
*G06Q 50/00* (2012.01)
*G06Q 10/10* (2012.01)

(52) U.S. Cl.
CPC ....... *G06F 17/30861* (2013.01); *G06Q 10/10* (2013.01); *G06Q 50/01* (2013.01)

(58) Field of Classification Search
None
See application file for complete search history.

(56) References Cited

U.S. PATENT DOCUMENTS

2007/0090951 A1  4/2007  Chan et al.
2010/0058196 A1  3/2010  Krishnan et al.

FOREIGN PATENT DOCUMENTS

JP  2006-092565 A  4/2006
JP  2007-164789 A  6/2007
(Continued)

OTHER PUBLICATIONS

Communication dated Jul. 7, 2016 issued by the State Intellectual Property Office of P.R. China in counterpart Chinese Patent Application No. 201380010682.8.
(Continued)

*Primary Examiner* — Syed Hasan
*Assistant Examiner* — Tuan-Khanh Phan
(74) *Attorney, Agent, or Firm* — Sughrue Mion, PLLC

(57) ABSTRACT

Disclosed are an apparatus and method for providing a community service. The apparatus includes a content analysis unit configured to generate a plurality of content figures representing a plurality of pieces of content, and generate connection relationships of the plurality of content figures according to connection relationships among the plurality of pieces of content, a content management unit configured to set a size value of an upper content figure based on lower content figures, from among the plurality of content figures, connected to lower hierarchies of the upper content figure, and a content transmitter configured to transmit connection relationships of the plurality of content figures and size data that includes the size value to a user terminal connecting to an on-line community. Accordingly, an overall trend may be noticed at a glance, and it may be possible to prevent content spamming because meaningless content would fall behind.

17 Claims, 6 Drawing Sheets

(56) References Cited

FOREIGN PATENT DOCUMENTS

KR     10-2008-0101063 A     11/2008
KR     10-2011-0125587 A     11/2011

OTHER PUBLICATIONS

Search Report dated Jun. 1, 2013, issued by the International Searching Authority in counterpart International Application No. PCT/KR2013/001290.

APPARATUS AND METHOD FOR PROVIDING COMMUNITY SERVICE

CROSS-REFERENCE TO RELATED APPLICATION

This application is an national phase application of international patent application No. PCT/KR2013/001290 filed on Feb. 19, 2013 that claims priority from Korean Patent Application No. 10-2012-0018584 filed on Feb. 23, 2012 in the Korean Intellectual Property Office, the disclosures of which are incorporated herein by reference in their entireties.

BACKGROUND

Technical Field

An exemplary embodiment relates to an apparatus and method for providing a community service, and more particularly, to a community service providing apparatus and method that make it possible to easily notice relationships among various pieces of content and the importance of content.

Description of the Related Art

An on-line community service provides a forum such that netizens can produce and share information by themselves and gather for activities.

As a typical on-line community service, an on-line society network is a social network service (SNS), denoting an on-line community, such as a society, a club, an Internet forum, a mini homepage, and a blog.

In an existing community service, a great number of comments and replies are sorted by only date or the number of recommendations, and thus there is a limit to showing relationships among various pieces of content. In other words, it is difficult to notice relationships among pieces of content and to determine which piece of content is a mainstream or a non-mainstream.

Korean Unexamined Patent Publication No. 2011-0125587 discloses a method of providing an SNS and a service providing server to which the method is applied. In the disclosed method, the intimacy between writing users is determined based on the users' frequencies of writing, numbers of posts, the lengths of posts, etc., in a thread consisting of original posts and comments, and users are selectively provided with rights to read or related content, a recommended identification (ID), etc., accordingly.

However, it is still difficult to notice relationships among various pieces of content and the importance of content at a glance.

SUMMARY

One or more exemplary embodiments are directed to providing a community service providing apparatus and method that visualize relationships among various pieces of content and the importance of content such that a user can recognize the relationships and the importance of content more easily and clearly.

One or more exemplary embodiments are also directed to providing a non-transitory computer-readable recording medium storing a program for instructing a computer to execute a community service providing method that visualizes relationships among various pieces of content and the importance of content such that a user can recognize the relationships and the importance of content more easily and clearly.

According to an aspect of an exemplary embodiment, there is provided an apparatus for providing a community service, the apparatus including: a content analysis unit configured to generate a plurality of content figures representing a plurality of pieces of content connected to each other in figures, and connect the plurality of content figures according to connection relationships among the plurality of pieces of content; a content management unit configured to increase a size of an upper content figure, which is any one of the plurality of content figures, with an increase in a number of lower content figures connected to lower hierarchies of the upper content figure; and a content transmission unit configured to transmit connection relationships and size data of the plurality of content figures to a user terminal connecting to an on-line community.

According to another aspect of an exemplary embodiment, there is provided a method of providing a community service, the method including: a content analysis operation of generating a plurality of content figures representing a plurality of pieces of content connected to each other in figures, and connecting the plurality of content figures according to connection relationships among the plurality of pieces of content; a content management operation of increasing a size of an upper content figure, which is any one of the plurality of content figures, with an increase in a number of lower content figures connected to lower hierarchies of the upper content figure; and a content transmission operation of transmitting connection relationships and size data of the plurality of content figures to a user terminal connecting to an on-line community.

According to a community service providing apparatus and method of the exemplary embodiments, content mainly corresponding to content figures having large sizes is grasped such that the overall trend can be noticed at a glance, and it is possible to fundamentally prevent spamming of content because meaningless content figures do not attract attention and fall behind. Also, since it is possible to know clear relationships of one opinion and help building collective intelligence, the community service providing apparatus and method can create a great synergy with a lot of existing related industries. Further, when content is searched centering on content figures having large sizes without using existing keyword search, a high search rate can be obtained, and search performance can be improved because illogical text, such as spammed posts and abuses, is not retrieved.

DETAILED DESCRIPTION

Hereinafter, an apparatus and method for providing a community service according to embodiments of the inventive concept will be described in detail with reference to the accompanying drawings.

Figure 1:
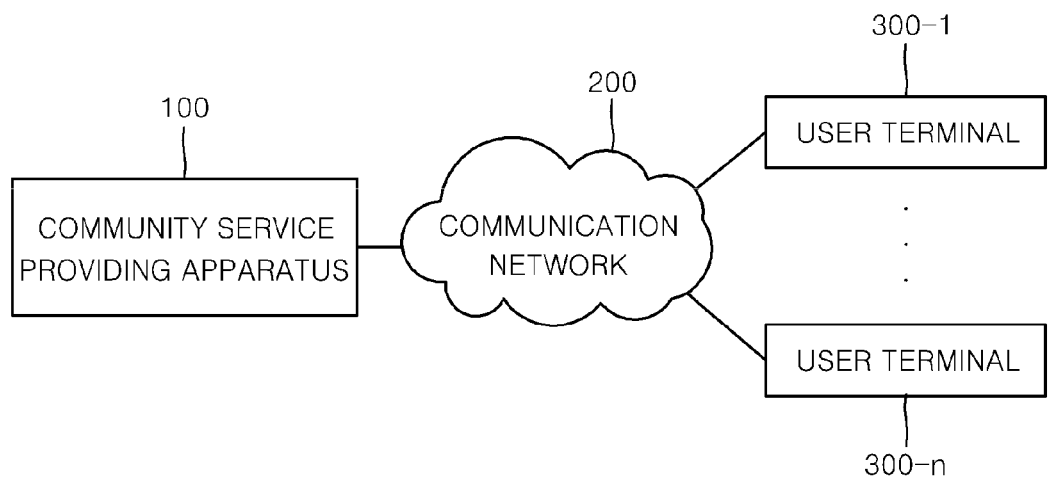
FIG. 1 is a diagram showing the overall constitution of a network including an apparatus for providing a community service according to an exemplary embodiment.

FIG. 1 is a diagram showing the overall constitution of a network including an apparatus for providing a community service according to an exemplary embodiment.

Referring to FIG. 1, a whole network system includes a community service providing apparatus 100 according to the present invention, a communication network 200, and a plurality of user terminals 300-1 to 300-$n$.

The community service providing apparatus 100 according to the present invention generates a plurality of content figures representing a plurality of pieces of content connected to each other in figures, and connects the plurality of content figures according to connection relationships among the plurality of pieces of content.

The content may be various text, audio, and video content, such as writing, broadcasting programs, music, movies, and animations, and the content figures denote various shapes of figures containing such content.

The plurality of content figures may be connected to each other in various structures. For example, the plurality of content figures may be connected in a hierarchical structure, such as a tree structure, and a plurality of content figures may be connected to one content figure.

Figure 2:
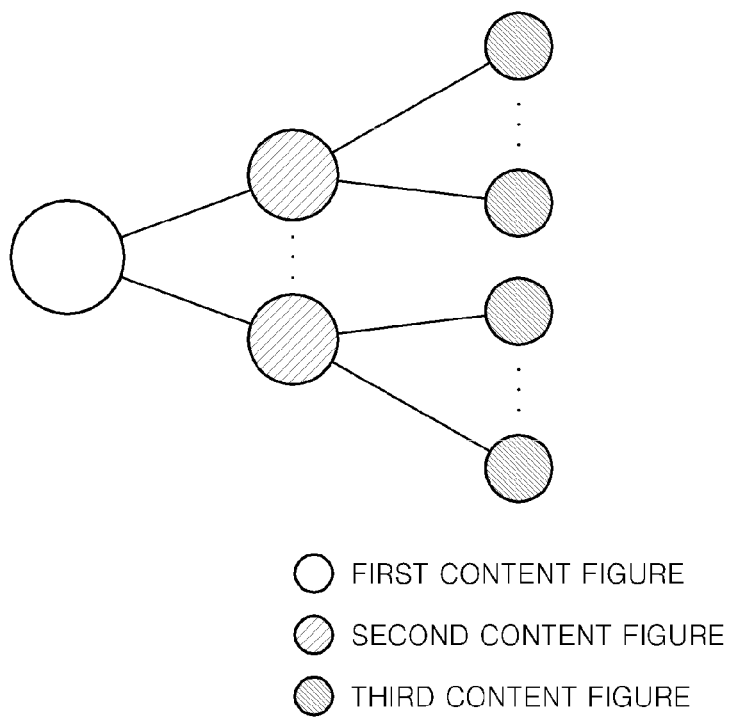
FIG. 2 is a diagram showing the hierarchical connection relationships among a plurality of content figures.

FIG. 2 is a diagram showing the hierarchical connection relationships among a plurality of content figures.

In connection relationships among a plurality of content figures, an upper content figure denotes any one of the plurality of content figures, and lower content figures denote content figures connected to lower hierarchies of the upper content figure.

For example, referring to FIG. 2, second content figures and third content figures are lower content figures with respect to a first content figure, and the first content figure is an upper content figure with respect to the second content figures and the third content figures.

Likewise, the third content figures are lower content figures with respect to the second content figures, and the second content figures are upper content figures with respect to the third content figures.

Lower content figures may be indicated by the hierarchies thereof. For example, the second content figures are first lower content figures with respect to the first content figure, and the third content figures are second lower content figures with respect to the first content figure.

The community service providing apparatus 100 increases the size of an upper content figure with an increase in the number of lower content figures according to connection relationship of content figures. Also, the community service providing apparatus 100 transmits the connection relationships and the size data of the plurality of content figures to the user terminals 300-1 to 300-$n$ that connect to the on-line community.

Meanwhile, the community service providing apparatus 100 may be implemented in various on-line community service environments. Specifically, the community service providing apparatus 100 may be implemented in various social network services (SNSs), such as a society, a club, an Internet forum, a mini homepage, and a blog.

The communication network 200 may be a wireless local area network (WLAN), a local area network (LAN), a wide area network (WAN), a metropolitan area network (MAN), the Internet, or so on. The communication network 200 may be either a wired communication network or a wireless communication network, and may employ any communication scheme.

The user terminals 300-1 to 300-$n$ are used by users who intend to receive or post content. The user terminals 300-1 to 300-$n$ may be a computer, a tablet computer, a personal digital assistant (PDA), a portable multimedia player (PMP), a mobile phone, an Internet protocol (IP) television (TV), or so on.

In this way, the community service providing apparatus 100 visualizes content and provides the visualized content to the user terminals 300-1 to 300-$n$, such that users can recognize relationships among various pieces of content and the importance of content more easily and clearly.

Figure 3:
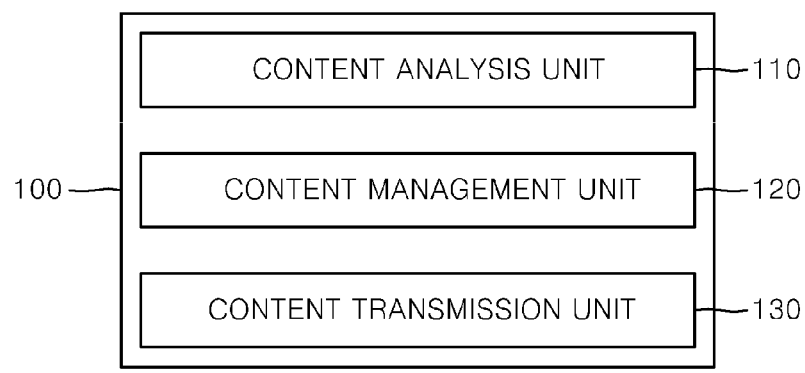
FIG. 3 is a block diagram showing the constitution of an apparatus for providing a community service according to an exemplary embodiment.

FIG. 3 is a block diagram showing the constitution of the community service providing apparatus 100 according to an exemplary embodiment.

Referring to FIG. 3, the community service providing apparatus 100 includes a content analysis unit 110, a content management unit 120, and a content transmission unit 130.

The content analysis unit 110 generates a plurality of content figures representing a plurality of pieces of content hierarchically connected to each other in figures, and connects the plurality of content figures according to connection relationships among the plurality of pieces of content.

The content management unit 120 increases the size of an upper content figure, which is any one of the plurality of content figures, with an increase in the number of lower content figures connected to a lower hierarchy of the upper content figure. According to another exemplary embodiment, a community service providing apparatus 100 may include an image processor that incorporates a content analysis unit 110 and a content management unit 120. The community service providing apparatus 100 may still also include a content transmission unit, which may also be referred to simply as a transmitter, 130.

Figure 4:
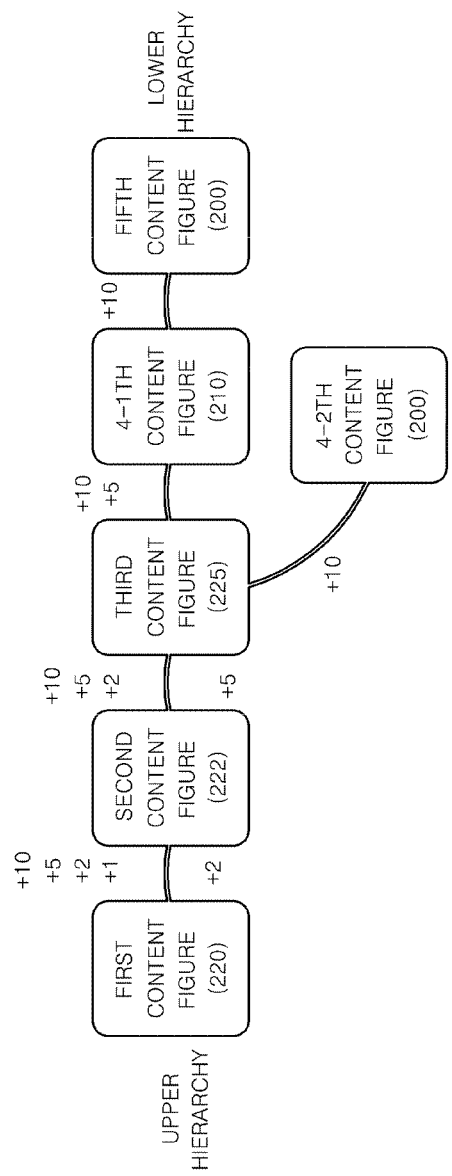
FIG. 4 is a diagram illustrating a method of determining the size of a content figure.

FIG. 4 is a diagram illustrating a method of determining the size of a content figure.

The content management unit 120 may increase the size of an upper content figure by adding previously set weights according to the hierarchies of lower content figures.

For example, referring to FIG. 4, numbers shown in a plurality of content figures denote the sizes of the content figures, which correspond to the sizes of the numbers. The sizes of the posted content figures are basically set to 200.

Different weights are set in advance such that the size of an upper content figure increases by 10 when a first lower content figure is added, by 5 when a second lower content is added, by 2 when a third lower content is added, and by 1 when a fourth lower content is added.

Specifically, the size of a first content figure increases by 10 through addition of a second content figure that is a first lower content figure, by 5 through addition of a third content figure that is a second lower content figure, by 2 through addition of each of a 4-$1^{th}$ content figure and a 4-$2^{th}$ content figure that are third lower content figures, and by 1 through addition of a fifth content figure that is a fourth lower content figure, thus becoming 220.

Likewise, the size of the second content figure increases by 10 through addition of the third content figure that is a first lower content figure, by 5 through addition of each of the 4-$1^{th}$ content figure and the 4-$2^{th}$ content figure that are second lower content figures, and by 2 through addition of the fifth content figure that is a third lower content figure, thus becoming 222.

Also, the size of the third content figure increases by 10 through addition of each of the 4-$1^{th}$ content figure and the 4-$2^{th}$ content figure that are first lower content figures, and by 5 through addition of the fifth content figure that is a second lower content figure, thus becoming 225.

The size of the 4-$1^{th}$ content figure increases by 10 through addition of the fifth content figure that is a first lower content figure and becomes 210, and the size of the 4-$2^{th}$ content figure has the basic value of 200 because there is no lower content figure.

Referring back to FIG. 3, the content management unit 120 may reduce the size of an upper content figure when the number of lower content figures is fixed or reduced for a previously set time period.

The number of lower content figures may be reduced in the case of deleting posted content like deletion of a comment, in the case of setting a post as a secret post to set a limit on content reading, and in other cases.

In addition, the content management unit 120 may reduce the size of a content figure that has not been selected by any user who connects to the on-line community for the previously set time period. This is because a content figure that has selected by no user may be regarded as content in which users are not interested any more.

Further, the content management unit 120 may reduce the size of an upper content figure when there is no lower content figure for a previously set time period.

When no lower content figure is posted or present any more, an upper content figure may be regarded as content that users are not interested in any more. Therefore, by reducing the size of the upper content figure, it is possible to relatively highlight other content figures that users are interested in.

Moreover, the content management unit 120 may reduce the sizes of a plurality of content figures when the number of the plurality of content figures is a previously set number or more. When the number and the sizes of content figures shown all over a screen continuously increase, it is difficult to show the content figures on the screen.

Therefore, it is possible to reduce the sizes of all content figures by a fixed ratio, or by different ratios according to the current sizes of the plurality of content figures.

Even when the sizes of all content figures are reduced by a fixed ratio, the sizes of the plurality of content figures differ from each other, and thus relative size ratios between the plurality of content figures may be kept as they are.

Figure 5:
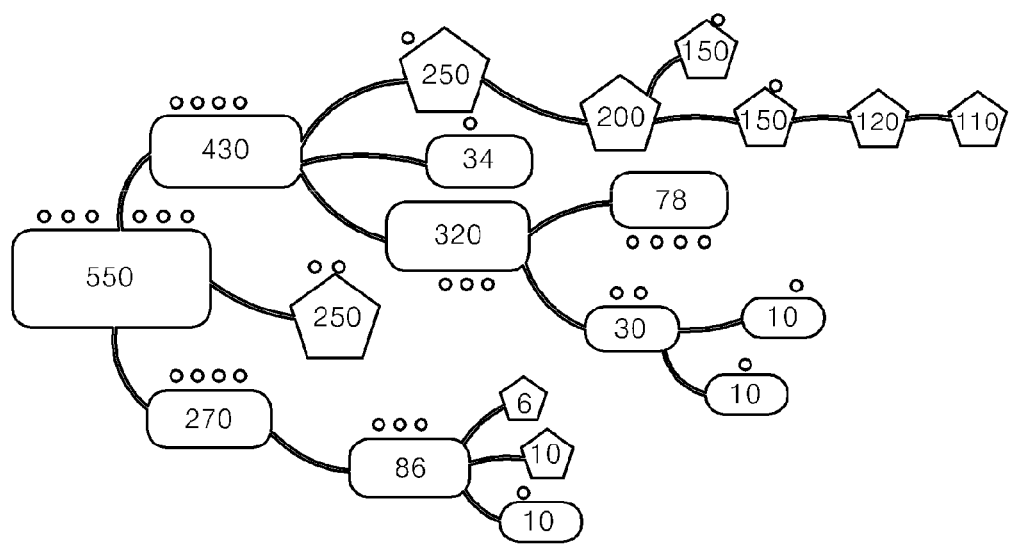
FIG. 5 is a diagram showing content figures having shapes that change over time.

FIG. 5 is a diagram showing content figures having shapes that change over time.

The content management unit 120 transforms the shapes of a plurality of content figures into other shapes after a previously set time period.

For example, referring to FIG. 5, a content figure posted as a pentagon is transformed into a quadrangle after the previously set time period. Therefore, a lately posted content figure is a pentagon, and users can easily identify and use lately posted content.

Figure 6:
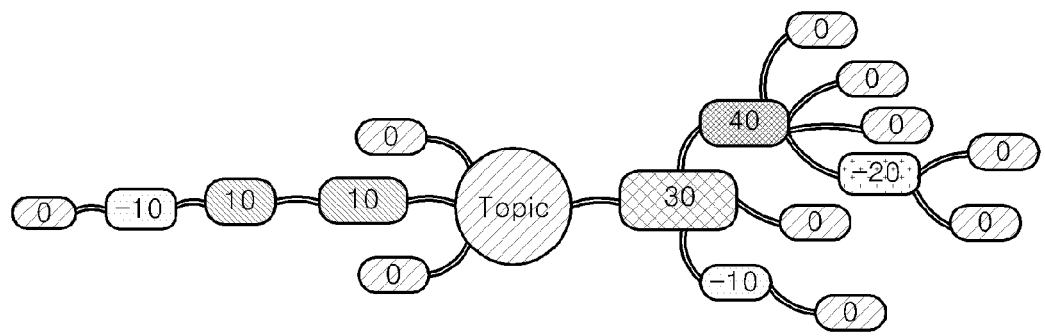
FIG. 6 is a diagram illustrating a method of determining the color of a content figure.

FIG. 6 is a diagram illustrating a method of determining the color of a content figure.

The content management unit 120 determines the color of each lower content figure according to a value given to the lower content figure, and determines the color of an upper content figure according to the sum of values given to lower content figures and a value given to the upper content figure.

For example, referring to FIG. 6, a poster of content figures may select values indicating the colors of the content figures. Specifically, a poster of a lower content figure may select a value of −100 to +100 according to the degree of agreement on an opinion posted on an upper content figure Topic when the poster posts a lower content figure.

Subsequently, from a table of colors gradually changing according to values, the content management unit 120 determines a color corresponding to the selected value as the color of the lower content figure.

Also, the content management unit 120 determines a color corresponding to the sum of values given to the lower content figures and the value given to the upper content figure as the color of the upper content figure.

In this way, by gradually differently showing the colors of a plurality of content figures, it is possible to visually notice users' opinions on one subject matter with ease.

Referring back to FIG. 1, the content transmission unit 130, which may also be referred to as a content transmitter, transmits connection relationship, shape, color, and size data of the plurality of content figures to the user terminals 300-1 to 300-$n$ that connect to the on-line community. Using the received data, the user terminals 300-1 to 300-$n$ generate a content configuration diagram consisting of the content figures.

Alternatively, the content transmission unit 130 may transmit the content configuration diagram showing connection relationships among the plurality of content figures to the user terminals 300-1 to 300-$n$ by itself.

When a user selects a content figure by clicking or using another method, the community service providing apparatus 100 according to the present invention may show the content of the selected content figure.

Figure 7:
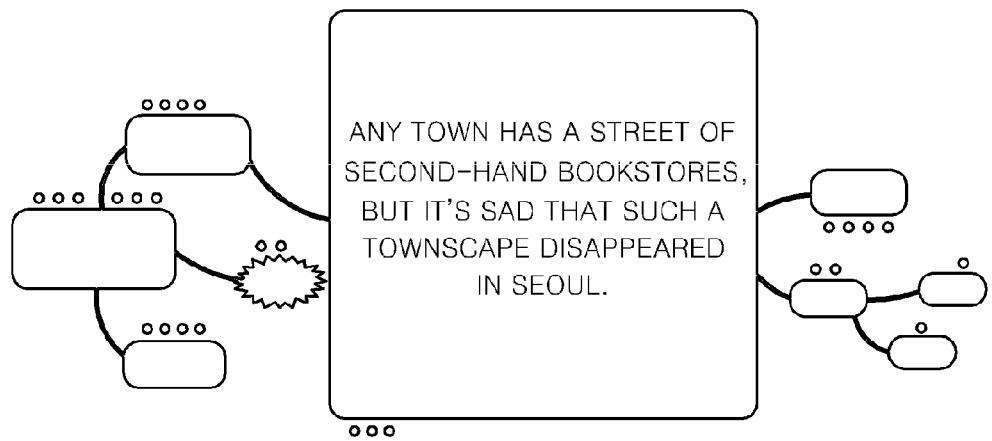
FIG. 7 is a diagram showing a selected content figure and a plurality of content figures.

FIG. 7 is a diagram showing a selected content figure and a plurality of content figures.

Referring to FIG. 7, when a user selects a content figure, the selected content figure is enlarged, and the content of the content figure is shown. At this time, connection relationships between the selected content figure and a plurality of content figures are maintained as before the content figure is selected.

The community service providing apparatus 100 according to the present invention may enlarge or reduce a content configuration diagram displayed on the screens of the user terminals 300-1 to 300-$n$.

Figure 8:
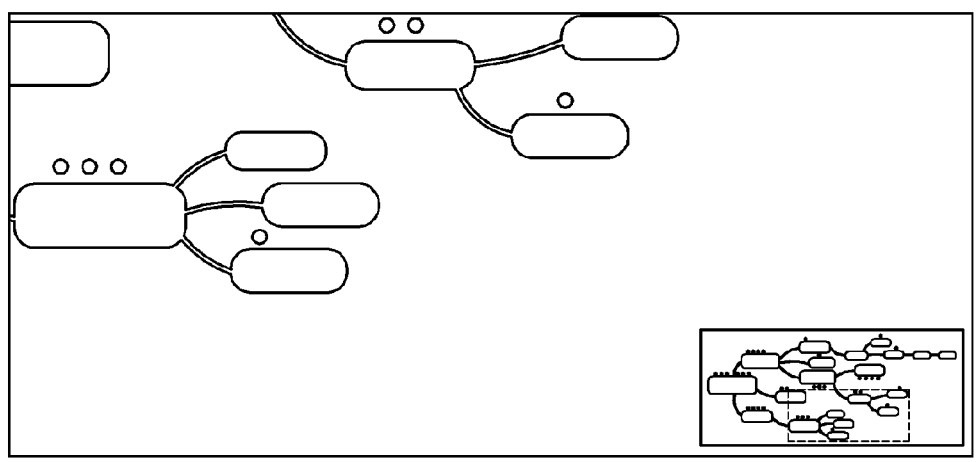
FIG. 8 shows enlarged and reduced content configuration diagrams.

FIG. 8 shows enlarged and reduced content configuration diagrams.

Referring to FIG. 8, the community service providing apparatus 100 enlarges or reduces a content configuration diagram according to the screen sizes of the user terminals 300-1 to 300-$n$. At this time, users may manipulate the content configuration diagram by dragging or touching or using another method, such that the content configuration diagram is displayed appropriately for the screen sizes of the user terminals 300-1 to 300-$n$.

Figure 9:
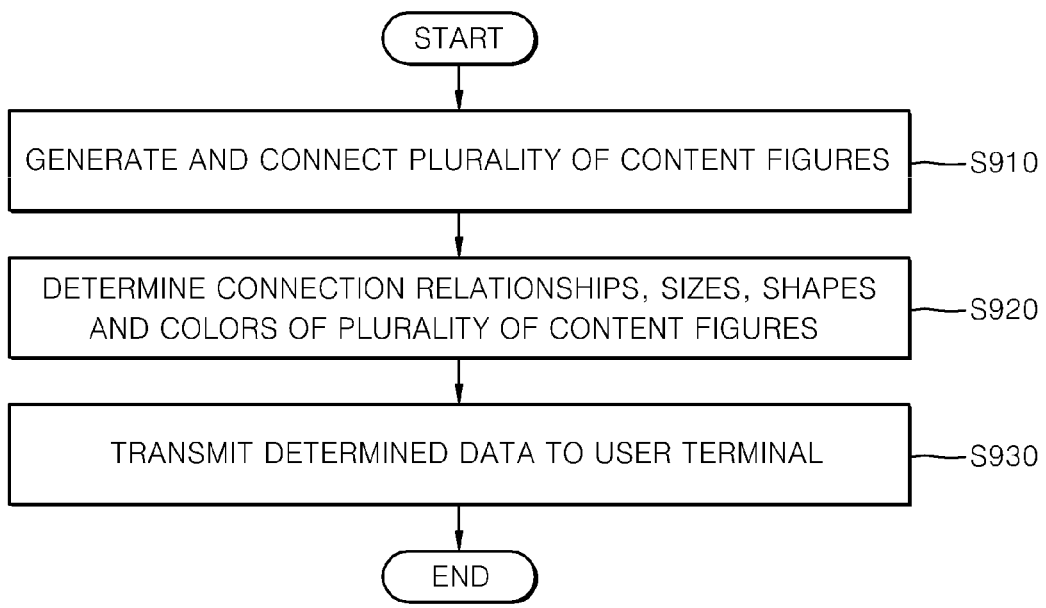
FIG. 9 is a flowchart illustrating a process of performing a method of providing a community service according to an exemplary embodiment.

FIG. 9 is a flowchart illustrating a process of performing a method of providing a community service according to an exemplary embodiment of the present invention.

The community service providing apparatus 100 generates a plurality of content figures representing a plurality of hierarchically connected pieces of content in figures, and connects the plurality of content figures according to connection relationships among the plurality of pieces of content (S910).

Subsequently, the community service providing apparatus 100 finds relationships among upper content figures and lower content figures, and determines the size, the shape, and the color of each content figure (S920).

The size of an upper content figure increases with an increase in the number of lower content figures. At this time, it is possible to increase the size of the upper content figure by different weights set according to the hierarchies of lower content figures.

Also, the size of the upper content figure is reduced when there is no lower content figure, or the number of lower content figures is fixed or reduced for a previously set time period. When the number of all content figures is a previously set number or more, it is possible to separately reduce the sizes of all the content figures.

A lately posted content figure is set to a distinguishable shape, such that a user can easily detect the lately posted content figure.

A poster of a content figure may select a value for determining a color when the poster posts the content figure. The color of a lower content figure is determined to be a color corresponding to the selected value, and the color of an upper content figure is determined to be a color corresponding to the sum of values selected for lower content figures and a value selected by a poster of the upper content figure.

Finally, the community service providing apparatus 100 transmits determined data to the user terminals 300-1 to 300-*n* (S930). At this time, the community service providing apparatus 100 may generate a content configuration diagram by itself and transmit the generated content configuration diagram to the user terminals 300-1 to 300-*n*.

The present invention can be implemented as computer-readable codes in a computer-readable recording medium. The computer-readable recording medium includes all types of recording media storing data that can be read by a computer system. Examples of the computer-readable recording medium include a read-only memory (ROM), a random access memory (RAM), a compact disc ROM (CD-ROM), a magnetic tape, a floppy disk, an optical data storage, and so on. The computer-readable recording medium can also be implemented in the form of carrier waves (e.g., transmission via the Internet). In addition, the computer-readable recording medium can be distributed to computer systems connected via a network, in which computer-readable codes can be stored and executed in a distributed manner.

While the invention has been shown and described with reference to certain exemplary embodiments thereof, it will be understood by those of ordinary skill in the art that various changes in form and details may be made therein without departing from the spirit and scope of the invention as defined by the appended claims.

The invention claimed is:

1. An apparatus for providing a community service, the apparatus comprising:
 a processor configured to generate a plurality of content figures representing a plurality of pieces of content, and generate connection relationships of the plurality of content figures according to connection relationships among the plurality of pieces of content;
 the processor being further configured to set a size value of an upper content figure, from among the plurality of content figures, based on lower content figures, from among the plurality of content figures, connected to lower hierarchies of the upper content figure, wherein the plurality of content figures are hierarchically connected to each other; and
 a content transmitter configured to transmit connection relationships of the plurality of content figures and size data that includes the size value to a user terminal connecting to an on-line community,
 wherein the plurality of pieces of content are a posted content on the community service,
 wherein the processor is further configured to set the size value of the upper content figure based on a number of lower content figures and a weight value set to each hierarchy of the lower content figures, and
 wherein the weight value is set to a smaller value as a difference between a hierarchy of the upper content figure and a hierarchy of the lower content figures increases.

2. The apparatus of claim 1, wherein the content transmitter is further configured to transmit a content configuration diagram consisting of the plurality of content figures to the user terminal.

3. The apparatus of claim 1, wherein the processor is further configured to reduce the size value of the upper content figure in response to the lower content figures that are connected being fixed or reduced for a set time period.

4. The apparatus of claim 1, wherein the processor is further configured to reduce the size value of at least one of the plurality of content figures that remains unselected by a user connecting to the on-line community for a set selection time period.

5. The apparatus of claim 1, wherein the processor is further configured to reduce the size value of the upper content figure in response to there being no lower content figures for a set time period.

6. The apparatus of claim 1, wherein the processor is further configured to reduce size values of the plurality of content figures in response to the plurality of content figures being equal to or greater than a previously set number.

7. The apparatus of claim 1, wherein the processor is further configured to transform shapes of the plurality of content figures into other shapes after a set time period.

8. The apparatus of claim 1,
 wherein the processor is further configured to determine a color of each of the lower content figures according to lower color values given to the lower content figures, and determine a color of the upper content figure according to a sum of the lower color values given to the lower content figures and an upper color value given to the upper content figure, and
 wherein the content transmitter is further configured to transmit color data that includes the upper color value and the lower color values to the user terminal.

9. A method of providing a community service, comprising:
 generating a plurality of content figures representing a plurality of pieces of content;
 generating connection relationships of the plurality of content figures according to connection relationships among the plurality of pieces of content;
 setting a size value of an upper content figure, from among the plurality of content figures, based on lower content figures, from among the plurality of content figures, connected to lower hierarchies of the upper content figure, wherein the plurality of content figures are hierarchically connected to each other; and
 transmitting connection relationships of the plurality of content figures and size data that includes the size value to a user terminal connecting to an on-line community,
 wherein the plurality of content are a posted content on the community service,
 wherein the method further comprises setting the size of the upper content figure based on a number of lower content figures and a weight value set to each hierarchy of the lower content figures; and wherein the weight value is set to a smaller value as a difference between a hierarchy of the upper content figure and a hierarchy of the lower content figures increases.

10. The method of claim 9, wherein the transmitting connection relationships further includes transmitting a content configuration diagram consisting of the plurality of content figures to the user terminal.

11. The method of claim 9, wherein the setting the size value further includes reducing the size value of the upper content figure in response to the lower content figures that are connected being fixed or reduced for a set time period.

12. The method of claim 9, wherein the setting the size value further includes reducing the size value of at least one of the plurality of content figures that remain unselected by a user connecting to the on-line community for a set selection time period.

13. The method of claim 9, wherein the setting the size value further includes reducing the size value of the upper content figure in response to there being no lower content figures for a set time period.

14. The method of claim 9, wherein the setting the size value further includes reducing size values of the plurality of content figures in response to the plurality of content figures being equal to or greater than a previously set number.

15. The method of claim 9, wherein the setting the size value further includes transforming shapes of the plurality of content figures into other shapes after a set time period.

16. The method of claim 9, wherein the setting the size value further includes:
  determining a color of each of the lower content figures according to lower color values given to the lower content figures;
  determining a color of the upper content figure according to a sum of the lower color values given to the lower content figures and an upper color value given to the upper content figure; and
  transmitting color data that includes the upper color value and the lower color values to the user terminal.

17. A non-transitory computer-readable recording medium storing a program for instructing a computer to execute the method of claim 9.

\* \* \* \* \*